United States Patent [19]

Szabo, Jr. et al.

[11] 4,457,019
[45] Jun. 26, 1984

[54] SYSTEM FOR SEPARATELY RECEIVING MULTIPLE STATION AUDIO-TOUR SIGNALS

[75] Inventors: Steve Szabo, Jr., Norwalk; Noel A. Yaney, Darien, both of Conn.

[73] Assignee: By-Word Corporation, East Norwalk, Conn.

[21] Appl. No.: 407,452

[22] Filed: Aug. 12, 1982

[51] Int. Cl.³ .................. H04B 5/00; H04B 15/00
[52] U.S. Cl. .................................. 455/41; 179/82; 455/50; 455/63
[58] Field of Search ............. 455/3, 41, 49, 50, 53, 455/54, 62, 63, 295, 296; 179/82; 370/69.1

[56] References Cited

U.S. PATENT DOCUMENTS

| | | | |
|---|---|---|---|
| 2,545,511 | 3/1951 | Brinkley | 455/50 |
| 3,078,348 | 2/1963 | McIntosh | 179/82 |
| 3,118,144 | 1/1964 | Arber | 455/41 |

Primary Examiner—Marc E. Bookbinder
Attorney, Agent, or Firm—Haynes N. Johnson

[57] ABSTRACT

A system is provided for the separate reception of a selected one of multiple and proximate AM modulated frequencies, for use in self-guided audio-tours of museums and similar facilities.

The system includes a series of listening zones, each of which is normally associated with a pre-recorded, repeating taped message. The messages are broadcast to an AM receiver from a plurality of induction loops, each one associated with its respective station and respective taped message. Adjacent induction loops use different, but proximate, carrier frequencies. The messages are received on a broad-band, non-tunable AM receiver which "captures" the frequency of the carrier for the particular viewing station and excludes "crosstalk" from adjacent stations.

9 Claims, 5 Drawing Figures

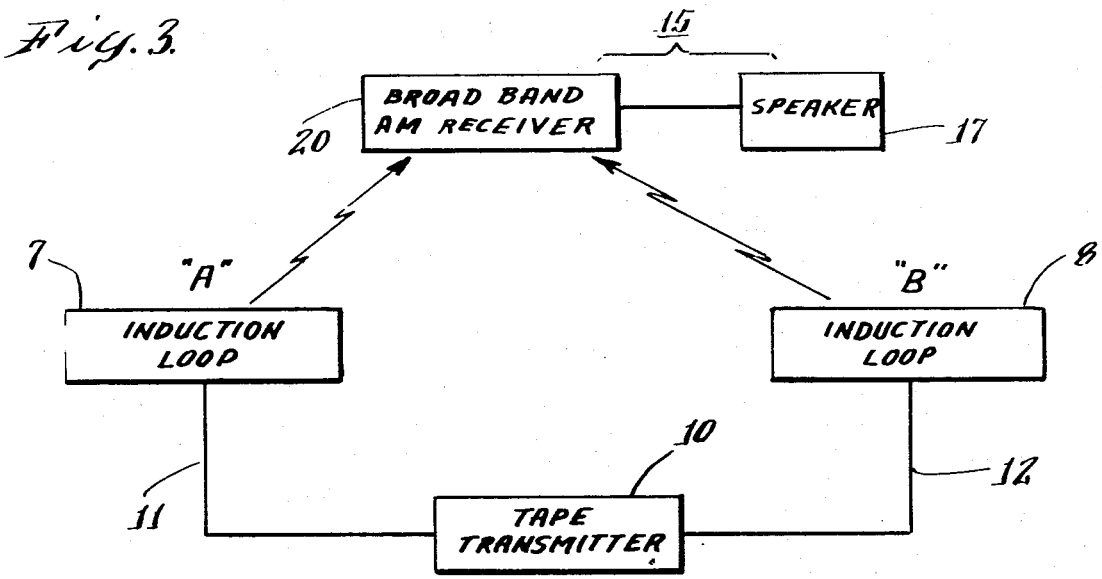
Fig. 3.
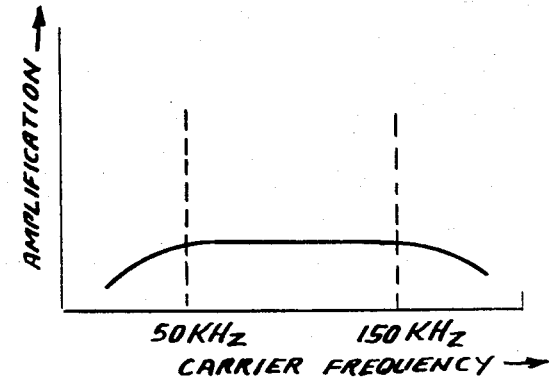
Fig. 4.
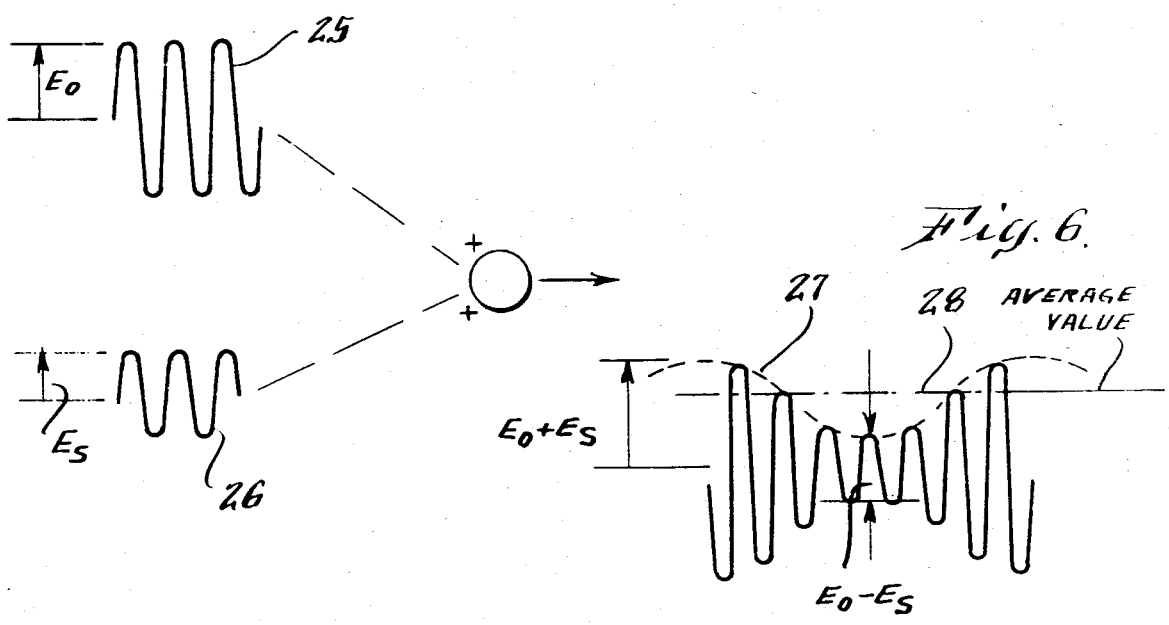
Fig. 5.
Fig. 6.

SYSTEM FOR SEPARATELY RECEIVING MULTIPLE STATION AUDIO-TOUR SIGNALS

BACKGROUND

On museum tours, plant tours, and the like, it is useful to have a series of pre-recorded, taped messages to be listened to by the visitor. If these messages come from a speaker located at each station of the exhibit, visitors may have difficulty in hearing it because of ambient noise or interference from another speaker.

Accordingly, visitors may carry a pre-tuned radio receiver to receive a weak broadcast signal. In this way, recorded messages are automatically heard by visitors in the vicinity, distracting noises are avoided, and the visitor can spend as much or as little time as he wishes at each station. Transmission to the receiver is normally from an induction loop proximate to the listening zone.

Such systems have inherent problems of "cross-talk" between adjacent broadcasting zones in which both stations are heard at the same time. One way of preventing "cross-talk" is to keep the power level of either the carrier wave or the amplifier in the receiver low or to separate the antennas; this, however, caused difficulties for the hard of hearing. Another solution has been to use multiple carrier frequencies, using different ones for each zone. This has, in the past, required a more expensive receiver adapted for several frequencies and operation of the receiver by the visitor. Another system has been to include a scanner which selects the strongest carrier frequency and eliminates others; this is complex and expensive.

The phenomenon of interfering modulated AM signals has been previously observed. See Terman, Electronic and Radio Engineering, 1955, p. 565; Terman, Radio Engineers' Handbood, 1943, p. 577; Aiken, Theory of Detection of Two Modulated Waves by a Linear Rectifier, Proc. I.R.E., Vol. 21, April 1933, p. 601, and the references cited. The phenomenon, however, appears to have been viewed as a problem, having no utility, and creating, whistle, sideband noise, or flutter. For it to effectively suppress the weaker signal, the ratio between the signal amplitudes supposedly should exceed 2:1. Apparently no practical use of the phenomenon, such as is the present system, has been suggested.

SUMMARY OF THE INVENTION

The present invention relates to an audio-tour system in which a person visiting a museum, taking a plant tour, or the like may receive messages through a hand-held AM radio receiver. The messages vary from one listening zone to another and may be pre-recorded, repeating taped messages or live "broadcasts".

The audio-tour system utilizes different, but proximate, carrier frequencies, AM modulated, at adjacent listening zones. The carrier wave is preferably transmitted through an induction coil in a hand-held receiver. Rather than having a narrow-band receiver, with a high Q for sharp tuning, the receiver is a broad-band receiver capable of receiving frequencies transmitted by all of the loops in the system.

It has been found that if proximate carrier frequencies are used in an AM system, together with a broad-band AM receiver, the stronger signal will "capture" the receiver and exclude the weaker signal, avoiding "cross-talk." This phenomenon appears similar to the "capture" phenomenon found in FM. Its principle of operation is not fully understood but it would appear that, even with carrier signals that are of near or almost equal strength, the receiver looks upon the larger signal as the carrier and the smaller signal as nothing more than an aberrant modulation of the carrier which averages out to a net signal strength of zero. Thus, the stronger carrier signal becomes dominant.

Close carrier frequencies are desirable. If, however, they are of such a proximity that the difference in frequency can produce an audible beat signal, this can be eliminated by the use of a notch filter in the receiver.

DESCRIPTION OF THE DRAWINGS

FIG. 3 is a schematic representation of the system.

FIG. 4 is a typical broad-band amplification curve as might be used in the receivers in this invention.

FIG. 5 is a graphical representation of the nature of two proximate carrier frequencies received by the receiver in the system.

DETAILED DESCRIPTION OF THE INVENTION

This invention involves an audio-tour system in which a visitor to a museum or similar establishment may receive different pre-recorded, repeating, taped messages at each of a plurality of listening zones.

The system includes within the system a taped message player which repeatedly and continuously plays a series of different pre-recorded tapes, one for each listening zone. The message for each tape is then used for AM modulation of a carrier wave which is fed to an induction loop associated with its respective listening zone. The induction loop then broadcasts the pre-recorded message for the station associated with the loop at the carrier frequency assigned to the loop. Adjacent zones utilize different frequencies. The entire system may be operated on only two frequencies which alternate between alternate listening zones.

The system includes a hand-held radio receiver adaped for broad-band reception to receive all of the carrier frequencies used in the system. It is carried by the visitor and receives the taped, pre-recorded message for the given listening zone. By the nature of the system, to be described below, the strongest carrier frequency signal received by the receiver, dominates the receiver, "captures" it, and blanks out the other frequency, thus avoiding "cross-talk." If only two frequencies are used in the system, the signal strength of a similar carrier frequency from a distant transmitting induction loop will be too weak to create any "cross-talk" problem.

Figure 1:
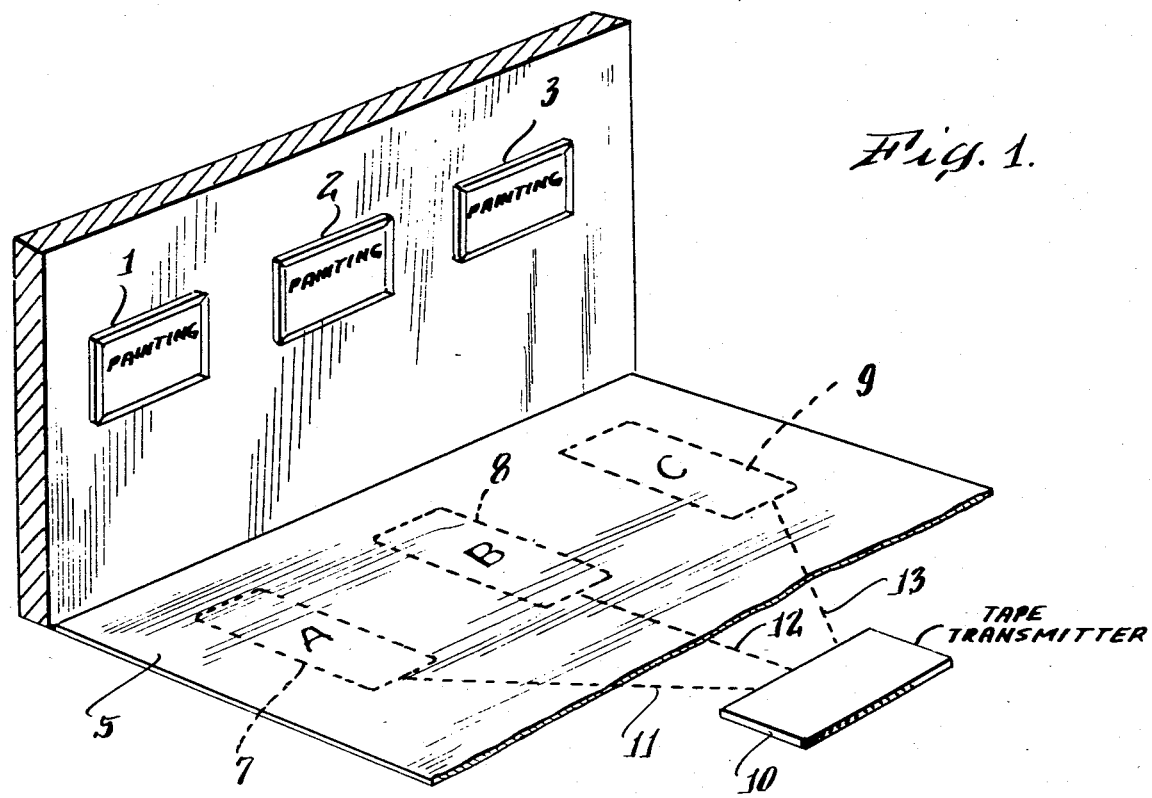
FIG. 1 is a generalized perspective view of a typical situation in which the system of this invention is used, such as a museum.

FIG. 1 illustrates a typical use of the invention as, for example, in a museum. For purposes of illustration of the invention, three paintings, 1, 2, and 3, are shown being displayed. These represent three different listening zones, "A", "B", and "C", respectively, for each of which the visitor will receive a pre-recorded, taped message.

An induction loop is located somewhere near each painting or zone. In this instance, the induction loops are hidden beneath carpet 5 as loop 7 for zone "A", loop 8 for zone "B", and loop 9 for zone "C". The loops are connected to tape transmitter 10 by wire transmitter leads 11, 12, and 13, respectively.

Tape transmitter 10 is shown in FIGS. 1 and 3 and is adapted to repeatedly play separate taped messages for each zone, and to use those messages to modulate a carrier wave which it generates, and to transmit the modulated carrier to the induction loop for the particular zone. For example, a taped message for zone "A" goes from tape transmitter 10 through lead 11 to induction loop 7 and is then transmitted from loop 7. The message relates to the subject matter of zone "A", which in this instance is painting 1.

The frequency of the carrier wave used for zone "B" is different from that of zone "A" and the frequency of the carrier wave used for zone "C". The frequency of the carrier waves for stations "A" and "C" can be the same as each other or different. For simplicity and economy of design normally alternating zones such as "A" and "C" will have the same frequency which will differ from the frequency of the in-between "B" zone. In this way, the tape transmitter need only generate two different carrier wave frequencies and transmit them as alternate frequencies to alternate transmitting stations.

Figure 2:
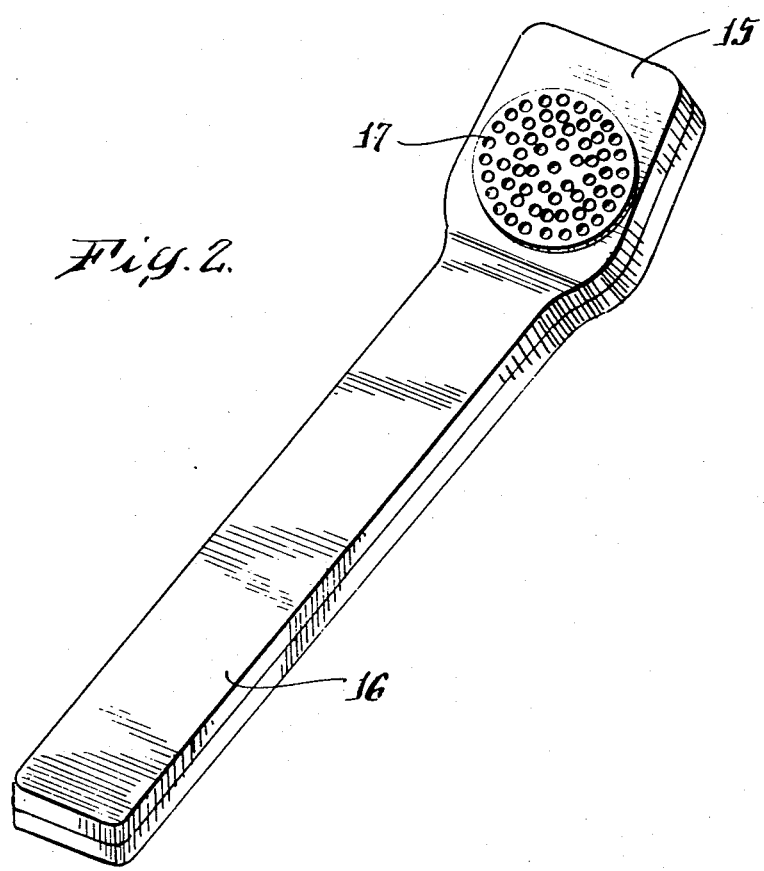
FIG. 2 is a perspective view showing the exterior of a typical hand-held receiver.

FIG. 2 is a perspective view of a hand-held receiver 15 used by the visitor, with handle 16 and speaker 17. It may, if desired, also have recharging contacts at the lower portion of the handle 16 for recharging it, but such is not part of the present invention. Receiver 15 is made of plastic material and includes an AM radio receiver, together with an internal induction coil for reception and power supply. The receiver is a wide-band receiver and need not be tunable. Its band width is adequate to cover all carrier wave frequencies used in the system.

In use, the visitor holds the receiver close to his ear while he stands at a zone or proceeds from one zone to another. As will be described below, he receives only the taped message being transmitted for the zone most proximate to his position.

The general operation of the system is illustrated in FIGS. 3 and 4 with a two-zone system. Tape transmitter 10 feeds induction loops 7 and 8 through leads 11 and 12 respectively. Loop 7 transmits the message related to zone "A", and loop 8 transmits the message for zone "B". Two different carrier frequencies are used, both of which are received by the receiver 15. The relative strengths of the received signals is determined by the relative amplitudes of the transmitted signal (which normally are the same) and, more particularly by the position of the receiver 15 relative to induction loops 7 and 8. In the illustration of FIG. 3, receiver 15 is shown in an intermediate position between the two loops, but slightly closer to zone "A". Though, theoretically, cross-talk should occur here, the receiver 20 will lock into the slightly stronger "A" signal. As the user moves closer to loop "B", the receiver will lock into the "B" signal.

Receiver 15 includes a broad-band AM radio receiver 20 and speaker 17. The radio has a broad-band amplification curve such as is shown in FIG. 4. (It should be noted that the radio receiver, being broad-band, does not use an intermediate frequency nor does it include a heterodyne circuit.) Though other frequency ranges may be chosen, a flat curve between about 50 and 150 kilohertz, enabling reception utilizing the "capture" feature anywhere within this range, works well.

I have found that the elimination of cross-talk in this system is greatest when the distance between the carrier frequencies is about two to four kilohertz and that it must be at least about one kilohertz. A problem is created in this difference range, however, due to the beat frequency created. According to the Fletcher-Munson curve, the ear is almost sensitive to frequencies of approximately 2,200 hertz. Consequently, beat frequencies within this range are distracting and should be eliminated. The beat frequency can be eliminated by any desired means, such as by use of a notch filter in the receiver.

Since the use of a notch filter adds to cost, I find it preferable and almost as satisfactory to use a difference frequency of 12 to 15 kilohertz. There the beat frequency is not noticeable to the average individual.

An example of preferred frequencies include 48 and 50 KHZ with the use of a notch filter and 48 and 63 KHZ in the absence of a filter. Other frequencies may be used as a carrier frequency between the range of 50 KHZ and 150 KHZ as long as they are not subject to interference from other signals.

I have found that power output from each induction loop should be in the order of 100 milliwatts and, as such, will serve a listening area of up to approximately 3,000 to 4,000 square feet.

In use, the museum visitor or other person carries a hand-held receiver with him while viewing an exhibit such as shown in FIG. 1, and holds speaker 17 close to his ear. When he is positioned generally in the center of one zone he will hear the taped or live message being transmitted for that zone. In the central area of the next zone, he will hear the message being transmitted for that station. The problem arises, however, when the visitor is with a large group and cannot be centered within the station area but, rather, is near the periphery, or when he is moving from one station to the other while listening. This has, in the past, resulted in the receipt of crosstalk from the weaker of the two stations, making understanding the primary station more difficult.

Curiously, however, when utilizing the system of my invention, there is substantially no cross-talk in the transitional area. Rather, the listener hears the transmission only for the more dominant transmitting station; and the transmission from the less dominant transmitting station is blanketed out. The stronger station signal is "captured" or locked in by the receiver, with much the same effect as one hears in FM reception.

This "capture" phenomenon was discovered during some experimental laboratory work on overall system design. One explanation of the phenomenon may be found in the wave form illustration of FIG. 5 and in the references cited above. FIG. 5 shows, at the left, a wave form representation of the dominant carrier wave $E_o$ identified as 25, and the interfering (potential cross-talk) signal $E_s$, identified as 26. $E_o$ has a greater signal strength and a slightly different frequency than $E_s$. The addition envelope is shown in FIG. 6 by the dotted line 27 and the average value by the line 28. Line 27 represents a beat frequency.

Since the two carrier signals $E_o$ and $E_s$ are of different frequencies, they are, at times, in phase and their amplitudes additive, yielding peaks of $E_o$ plus $E_s$; at other times they are out of phase and their amplitudes subtractive, leaving valleys of $E_o$ minus $E_s$. The AM detector essentially "sees" only the average carrier amplitude and the average value does not significantly differ from $E_o$. As can be seen, the interfering signal $E_s$ (the one with lesser amplitude) causes the carrier amplitude $E_o$ to vary up and down by $E_s$, but the average value remains sustantially $E_o$. Otherwise phrased, an interfering signal, smaller than the main signal, appears not to affect the average value of the main signal significantly. Thus, when in an area of "contention" between two signals, the average carrier becomes dependent primarily on the larger signal, which, as a result, essentially dominates the detector.

Calculations made as to the increase in the average (demodulated carrier) value of a signal to the interfering effect of another signal show that, for example, an interfering signal equal to as much as one-half the carrier and modulated fifty percent AM would affect the carrier modulation less than six or seven percent. As a practical matter, this is insignificant and rapidly decreases as the amount of interference decreases.

Phrased another way, when the receiver receives two carrier waves of slightly different frequency, is apparently responds as though the larger signal alone were the carrier frequency and the smaller signal were no more than a minor AM modulation of the carrier. Then, as soon as the lesser carrier signal becomes greater, as the receiver is moved from one viewing station toward the other, the positions of the signals are interchanged; and the previously smaller signal now acts as the carrier, with the previously larger signal providing only a small degree of modulation.

Numerous uses can be made of the system of this invention including use in lecture halls, classrooms and industrial areas. Similarly, it would appear that the system would be functional using electro-magnetic coupling with antennae rather than with the induction coupling loops which appear to be preferable.

I claim:

1. An audio-tour system in which a visitor may receive a different message at each of a plurality of pre-determined listening zones including:

means for producing a first carrier wave,
   means for producing a second carrier wave, the frequency of said second carrier wave being different from that of said first carrier wave,
   means for amplitude modulating each said wave with respective different messages,
   a first induction loop and a second induction loop spaced from one another and connected to said last-named means, to transmit said modulated first and said second carrier waves respectively,
   an untuned broadband radio receiver having a bandwidth including the frequencies of said carrier waves and having a substantially flat response curve over the frequencies of said carrier waves, to receive said waves and detect the amplitude modulation thereon, and
   the signal strength of the signals transmitted from said first induction loop approximating the signal strength of the signals transmitted from said second induction loop,
   whereby, when the system is used, one said carrier wave will dominate the other said carrier wave, depending upon the relative signal strengths of said waves at said receiver, and thereby effect a substantial reduction in cross-talk between said two transmitted messages.

2. An audio-tour system as set forth in claim 1 having more than two said listening zones and having said first and said second carrier wave transmission frequencies alternate between adjacent said listening zones.

3. An audio-tour system as set forth in claim 1 in which said carrier waves have frequencies between 50 kilohertz and 150 kilohertz.

4. An audio-tour system as set forth in claim 1 in which the frequencies of said carrier waves differ by at least one kilohertz but by no more than 4 kilohertz.

5. An audio-tour system as set forth in claim 4 including means for eliminating beat frequencies between said first carrier wave and said second carrier wave.

6. An audio-tour system as set forth in claim 5 in which said means for eliminating beat frequencies include a notch filter.

7. An audio-tour system as set forth in claim 1 in which said first carrier wave has a frequency of about 48 kilohertz and said second carrier wave has a frequency of about 63 kilohertz.

8. An audio-tour system as set forth in claim 1 in which said respective different messages are pre-recorded, repeating taped messages.

9. An audio-tour system in which a visitor may receive a different pre-recorded, repeating, taped message at each of a plurality of pre-determined listening zones including:

means for producing a first carrier wave, means for producing a second carrier wave, the frequency of said first carrier wave being at least one kilohertz different from that of said carrier wave,
   repeating tape recorder and modulating means for amplitude modulating each said carrier wave with different prerecorded messages,
   means for transmitting the modulated said first and said second carrier waves directly to respective pre-determined listening zones,
   an untuned broadband radio receiver having a bandwidth including the frequencies of said carrier waves and having a substantially flat response curve over the frequencies of said carrier waves, to receive said waves and detect the amplitude modulation thereon, and
   the signal strength of said transmitted signals being approximately the same in their respective predetermined listening zones,
   whereby, when the system is in use, one said carrier wave will dominate the other said carrier wave, depending upon the relative signal strengths of said waves of said receiver, and thereby effect a substantial reduction in cross-talk between said two transmitted messages.

* * * * *